United States Patent
Radulescu et al.

(10) Patent No.: US 7,373,449 B2
(45) Date of Patent: May 13, 2008

(54) APPARATUS AND METHOD FOR COMMUNICATING IN AN INTEGRATED CIRCUIT

(75) Inventors: Andrei Radulescu, Eindhoven (NL); Kees Gerard Willem Goossens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 270 days.

(21) Appl. No.: 10/530,267

(22) PCT Filed: Oct. 7, 2003

(86) PCT No.: PCT/IB03/04414

§ 371 (c)(1),
(2), (4) Date: Apr. 5, 2005

(87) PCT Pub. No.: WO2004/034176

PCT Pub. Date: Apr. 22, 2004

(65) Prior Publication Data

US 2006/0041889 A1    Feb. 23, 2006

(30) Foreign Application Priority Data

Oct. 8, 2002 (EP) ................... 02079196

(51) Int. Cl.
*G06F 13/00* (2006.01)

(52) U.S. Cl. ............... 710/316; 709/227; 709/228
(58) Field of Classification Search ........ 710/300–317, 710/8–19, 56–61, 104–110; 709/201–203, 709/310–317, 227–229
See application file for complete search history.

(56) References Cited

U.S. PATENT DOCUMENTS

| 4,807,118 | A   | * | 2/1989 | Lin et al. ............... 709/237 |
| 5,317,568 | A   | * | 5/1994 | Bixby et al. ............ 370/401 |
| 6,539,450 | B1  | * | 3/2003 | James et al. ........... 710/306 |
| 6,629,166 | B1  | * | 9/2003 | Grun .................... 710/36 |
| 6,769,046 | B2  | * | 7/2004 | Adams et al. .......... 710/316 |
| 7,165,128 | B2  | * | 1/2007 | Gadre et al. ............ 710/52 |
| 2003/0110339 | A1 | * | 6/2003 | Calvignac et al. ...... 710/305 |
| 2003/0182419 | A1 | * | 9/2003 | Barr et al. ............ 709/224 |
| 2004/0103230 | A1 | * | 5/2004 | Emerson et al. ........ 710/110 |

OTHER PUBLICATIONS

Kumar et al; "A Network on Chip Architecture and Design Methodology", VLSI on Annual Symposium, IEEE Computer Society ISVLSI.2002 Pittsburgh, PA, Apr. 25, 2002.
Los Alamitos, CA.; pp. 117-124, XP002263346, unknown dates.

* cited by examiner

*Primary Examiner*—Raymond N Phan

(57) ABSTRACT

An integrated circuit comprising a plurality of processing modules (M; I; S; T) and a network (N; RN) arranged for providing at least one connection between a first and at least one second module is provided. Said connections comprises a set of communication channels each having a set of connection properties. Said connection supports transactions comprising outgoing messages from the first module to the second module and return messages from the second module to the first module. The connection properties of the different communication channels of said connection can be adjusted independently. Therefore, the utilization of the resources of a network on chip is more efficient, since the connection between modules can be efficiently adapted to their actual requirement, such that the connection is not over dimensioned and unused network resources can be assigned to other connections.

18 Claims, 1 Drawing Sheet

APPARATUS AND METHOD FOR COMMUNICATING IN AN INTEGRATED CIRCUIT

FIELD OF THE INVENTION

The invention relates to an integrated circuit having a plurality of processing modules and a network arranged for providing connections between processing modules and a method for exchanging messages in such an integrated circuit.

BACKGROUND OF THE INVENTION

Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the systems modules usually communicate to each other via a bus. As the number of modules increases however, this way of communication is no longer practical for the following reasons. On the one hand the large number of modules forms a too high bus load. On the other hand the bus forms a communication bottleneck as it enables only one device to send data to the bus. A communication network forms an effective way to overcome these disadvantages.

Networks on chip (NoC) have received considerable attention recently as a solution to the interconnect problem in highly-complex chips. The reason is twofold. First, NoCs help resolve the electrical problems in new deep-submicron technologies, as they structure and manage global wires. At the same time they share wires, lowering their number and increasing their utilization. NoCs can also be energy efficient and reliable and are scalable compared to buses. Second, NoCs also decouple computation from communication, which is essential in managing the design of billion-transistor chips. NoCs achieve this decoupling because they are traditionally designed using protocol stacks, which provide well-defined interfaces separating communication service usage from service implementation.

Using networks for on-chip communication when designing systems on chip (SoC), however, raises a number of new issues that must be taken into account. This is because, in contrast to existing on-chip interconnects (e.g., buses, switches, or point-to-point wires), where the communicating modules are directly connected, in a NoC the modules communicate remotely via network nodes. As a result, interconnect arbitration changes from centralized to distributed, and issues like out-of order transactions, higher latencies, and end-to-end flow control must be handled either by the intellectual property block (IP) or by the network.

Most of these topics have been already the subject of research in the field of local and wide area networks (computer networks) and as an interconnect for parallel machine interconnect networks. Both are very much related to on-chip networks, and many of the results in those fields are also applicable on chip. However, NoC's premises are different from off-chip networks, and, therefore, most of the network design choices must be reevaluated. On-chip networks have different properties (e.g., tighter link synchronization) and constraints (e.g., higher memory cost) leading to different design choices, which ultimately affect the network services.

NoCs differ from off-chip networks mainly in their constraints and synchronization. Typically, resource constraints are tighter on chip than off chip. Storage (i.e., memory) and computation resources are relatively more expensive, whereas the number of point-to-point links is larger on chip than off chip. Storage is expensive, because general-purpose on-chip memory, such as RAMs, occupy a large area. Having the memory distributed in the network components in relatively small sizes is even worse, as the overhead area in the memory then becomes dominant.

For on-chip networks computation too comes at a relatively high cost compared to off-chip networks. An off-chip network interface usually contains a dedicated processor to implement the protocol stack up to network layer or even higher, to relieve the host processor from the communication processing. Including a dedicated processor in a network interface is not feasible on chip, as the size of the network interface will become comparable to or larger than the IP to be connected to the network. Moreover, running the protocol stack on the IP itself may also be not feasible, because often these IPs have one dedicated function only, and do not have the capabilities to run a network protocol stack.

The number of wires and pins to connect network components is an order of magnitude larger on chip than off chip. If they are not used massively for other purposes than NoC communication, they allow wide point-to-point interconnects (e.g., 300-bit links). This is not possible off-chip, where links are relatively narrower: 8-16 bits.

On-chip wires are also relatively shorter than off chip allowing a much tighter synchronization than off chip. This allows a reduction in the buffer space in the routers because the communication can be done at a smaller granularity. In the current semiconductor technologies, wires are also fast and reliable, which allows simpler link-layer protocols (e.g., no need for error correction, or retransmission). This also compensates for the lack of memory and computational resources.

Reliable communication: A consequence of the tight on-chip resource constraints is that the network components (i.e., routers and network interfaces) must be fairly simple to minimize computation and memory requirements. Luckily, on-chip wires provide a reliable communication medium, which can help to avoid the considerable overhead incurred by off-chip networks for providing reliable communication. Data integrity can be provided at low cost at the data link layer. However, data loss also depends on the network architecture, as in most computer networks data is simply dropped if congestion occurs in the network.

Deadlock: Computer network topologies have generally an irregular (possibly dynamic) structure, which can introduce buffer cycles. Deadlock can also be avoided, for example, by introducing constraints either in the topology or routing. Fat-tree topologies have already been considered for NoCs, where deadlock is avoided by bouncing back packets in the network in case of buffer overflow. Tile-based approaches to system design use mesh or torus network topologies, where deadlock can be avoided using, for example, a turn-model routing algorithm. Deadlock is mainly caused by cycles in the buffers. To avoid deadlock, routing must be cycle-free, because of its lower cost in achieving reliable communication. A second cause of deadlock are atomic chains of transactions. The reason is that while a module is locked, the queues storing transactions may get filled with transactions outside the atomic transaction chain, blocking the access of the transaction in the chain to reach the locked module. If atomic transaction chains must be implemented (to be compatible with processors allowing this, such as MIPS), the network nodes should be able to filter the transactions in the atomic chain.

Data ordering: In a network, data sent from a source to a destination may arrive out of order due to reordering in network nodes, following different routes, or retransmission after dropping. For off-chip networks out-of-order data delivery is typical. However, for NoCs where no data is dropped, data can be forced to follow the same path between a source and a destination (deterministic routing) with no reordering. This in-order data transportation requires less buffer space, and reordering modules are no longer necessary.

Network flow control and buffering strategy: Network flow control and buffering strategy have a direct impact on the memory utilization in the network. Wormhole routing requires only a flit buffer (per queue) in the router, whereas store-and-forward and virtual-cut-through routing require at least the buffer space to accommodate a packet. Consequently, on chip, wormhole routing may be preferred over virtual-cut-through or store-and-forward routing. Similarly, input queuing may be a lower memory-cost alternative to virtual-output-queuing or output-queuing buffering strategies, because it has fewer queues. Dedicated (lower cost) FIFO memory structures also enable on-chip usage of virtual-cut-through routing or virtual output queuing for a better performance. However, using virtual-cut-through routing and virtual output queuing at the same time is still too costly.

Time-related guarantees: Off-chip networks typically use packet switching and offer best-effort services. Contention can occur at each network node, making latency guarantees very hard to offer. Throughput guarantees can still be offered using schemes such as rate-based switching or deadline-based packet switching, but with high buffering costs. An alternative to provide such time-related guarantees is to use time-division multiple access (TDMA) circuits, where every circuit is dedicated to a network connection. Circuits provide guarantees at a relatively low memory and computation cost. Network resource utilization is increased when the network architecture allows any left-over guaranteed bandwidth to be used by best-effort communication.

Introducing networks as on-chip interconnects radically changes the communication when compared to direct interconnects, such as buses or switches. This is because of the multi-hop nature of a network, where communication modules are not directly connected, but separated by one or more network nodes. This is in contrast with the prevalent existing interconnects (i.e., buses) where modules are directly connected. The implications of this change reside in the arbitration (which must change from centralized to distributed), and in the communication properties (e.g., ordering, or flow control).

An outline the differences of NoCs and buses will be given below. We refer mainly to buses as direct interconnects, because currently they are the most used on-chip interconnect. Most of the bus characteristics also hold for other direct interconnects (e.g., switches). Multilevel buses are a hybrid between buses and NoCs. For our purposes, depending on the functionality of the bridges, multilevel buses either behave like simple buses or like NoCs. The programming model of a bus typically consists of load and store operations which are implemented as a sequence of primitive bus transactions. Bus interfaces typically have dedicated groups of wires for command, address, write data, and read data. A bus is a resource shared by multiple IPs. Therefore, before using it, IPs must go through an arbitration phase, where they request access to the bus, and block until the bus is granted to them.

A bus transaction involves a request and possibly a response. Modules issuing requests are called masters, and those serving requests are called slaves. If there is a single arbitration for a pair of request-response, the bus is called non-split. In this case, the bus remains allocated to the master of the transaction until the response is delivered, even when this takes a long time. Alternatively, in a split bus, the bus is released after the request to allow transactions from different masters to be initiated. However, a new arbitration must be performed for the response such that the slave can access the bus.

For both split and non-split buses, both communication parties have direct and immediate access to the status of the transaction. In contrast, network transactions are one-way transfers from an output buffer at the source to an input buffer at the destination that causes some action at the destination, the occurrence of which is not visible at the source. The effects of a network transaction are observable only through additional transactions. A request-response type of operation is still possible, but requires at least two distinct network transactions. Thus, a bus-like transaction in a NoC will essentially be a split transaction.

Transaction Ordering: Traditionally, on a bus all transactions are ordered (cf. Peripheral VCI, AMBA, or CoreConnect PLB and OPB. This is possible at a low cost, because the interconnect, being a direct link between the communicating parties, does not reorder data. However, on a split bus, a total ordering of transactions on a single master may still cause performance penalties, when slaves respond at different speeds. To solve this problem, recent extensions to bus protocols allow transactions to be performed on connections. Ordering of transactions within a connection is still preserved, but between connections there are no ordering constraints (e.g., OCP, or Basic VCI). A few of the bus protocols allow out-of-order responses per connection in their advanced modes (e.g., Advanced VCI), but both requests and responses arrive at the destination in the same order as they were sent.

In a NoC, ordering becomes weaker. Global ordering can only be provided at a very high cost due to the conflict between the distributed nature of the networks, and the requirement of a centralized arbitration necessary for global ordering. Even local ordering, between a source-destination pair, may be costly. Data may arrive out of order if it is transported over multiple routes. In such cases, to still achieve an in-order delivery, data must be labeled with sequence numbers and reordered at the destination before being delivered. The communication network comprises a plurality of partly connected nodes. Messages from a module are redirected by the nodes to one or more other nodes. To that end the message comprises first information indicative for the location of the addressed module(s) within the network. The message may further include second information indicative for a particular location within the module, such as a memory, or a register address. The second information may invoke a particular response of the addressed module.

Atomic Chains of Transactions: An atomic chain of transactions is a sequence of transactions initiated by a single master that is executed on a single slave exclusively. That is, other masters are denied access to that slave, once the first transaction in the chain claimed it. This mechanism is widely used to implement synchronization mechanisms between master modules (e.g., semaphores). On a bus, atomic operations can easily be implemented, as the central arbiter will either (a) lock the bus for exclusive use by the master requesting the atomic chain, or (b) know not to grant access to a locked slave. In the former case, the time resources are locked is shorter because once a master has been granted access to a bus, it can quickly perform all the transactions in the chain (no arbitration delay is required for the subsequent transactions in the chain). Consequently, the locked slave and the bus can be opened up again in a short time. This approach is used in AMBA and CoreConnect. In the latter case, the bus is not locked, and can still be used by other modules, however, at the price of a longer locking time of the slave. This approached is used in VCI and OCP.

In a NoC, where the arbitration is distributed, masters do not know that a slave is locked. Therefore, transactions to a locked slaved may still be initiated, even though the locked slave cannot accept them. Consequently, to prevent deadlock, these other transactions in the atomic chain must be able to bypass them to be served. Moreover, the time a module is locked is much longer in case of NoCs, because of the higher latency per transaction.

Media Arbitration: An important difference between buses and NoCs is in the medium arbitration scheme. In a bus, master modules request access to the interconnect, and the arbiter grants the access for the whole interconnect at once. Arbitration is centralized as there is only one arbiter component, and global as all the requests as well as the state of the interconnect are visible to the arbiter. Moreover, when a grant is given, the complete path from the source to the destination is exclusively reserved. In a non-split bus, arbitration takes place once when a transaction is initiated. As a result, the bus is granted for both request and response. In a split bus, requests and responses are arbitrated separately.

In a NoC arbitration is also necessary, as it is a shared interconnect. However, in contrast to buses, the arbitration is distributed, because it is performed in every router, and is based only on local information. Arbitration of the communication resources (links, buffers) is performed incrementally as the request or response advances.

Destination Name and Routing: For a bus, the command, address, and data are broadcasted on the interconnect. They arrive at every destination, of which one activates based on the broadcasted address, and executes the requested command. This is possible because all modules are directly connected to the same bus. In a NoC, it is not feasible to broadcast information to all destinations, because it must be copied to all routers and network interfaces. This floods the network with data. The address is better decoded at the source to find a route to the destination module. A transaction address will therefore have two parts: (a) a destination identifier, and (b) an internal address at the destination.

Latency: Transaction latency is caused by two factors: (a) the access time to the bus, which is the time until the bus is granted, and (b) the latency introduced by the interconnect to transfer the data. For a bus, where the arbitration is centralized the access time is proportional to the number of masters connected to the bus. The transfer latency itself typically is constant and relatively fast, because the modules are linked directly. However, the speed of transfer is limited by the bus speed, which is relatively low.

In a NoC, arbitration is performed at each router for the following link. The access time per router is small. Both end-to-end access time and transport time increase proportionally to the number of hops between master and slave. However, network links are unidirectional and point to point, and hence can run at higher frequencies than buses, thus lowering the latency. From a latency prospective, using a bus or a network is a trade off between the number of modules connected to the interconnect (which affects access time), the speed of the interconnect, and the network topology.

Data Format: In most modern bus interfaces the data format is defined by separate wire groups for the transaction type, address, write data, read data, and return acknowledgments/errors (e.g., VCI, OCP, AMBA, or CoreConnect). This is used to pipeline transactions. For example, concurrently with sending the address of a read transaction, the data of a previous write transaction can be sent, and the data from an even earlier read transaction can be received. Moreover, having dedicated wire groups simplifies the transaction decoding; there is no need for a mechanism to select between different kinds of data sent over a common set of wires. Inside a network, there is typically no distinction between different kinds of data. Data is treated uniformly, and passed fron one router to another. This is done to minimize the control overhead and buffering in router. If separate wires would be used for each of the above-mentioned groups, separate routing, scheduling, and queuing would be needed, increasing the cost of routers.

In addition, in a network at each layer in the protocol stack, control information must be supplied together with the data (e.g., packet type, network address, or packet size). This control information is organized as an envelope around the data. That is, first a header is sent, followed by the actual data (payload), followed possibly by a trailer. Multiple such envelopes may be provided for the same data, each carrying the corresponding control information for each layer in the network protocol stack.

Buffering and Flow Control: Buffering data of a master (output buffering) is used both for buses and NoCs to decouple computation from communication. However, for NoCs output buffering is also needed to marshal data, which consists of (a) (optionally) splitting the outgoing data in smaller packets which are transported by the network, and (b) adding control information for the network around the data (packet header). To avoid output buffer overflow the master must not initiate transaction that generate more data than the currently available space. Similarly to output buffering, input buffering is also used to decouple computation from communication. In a NoC, input buffering is also required to un-marshal data.

In addition, flow control for input buffers differs for buses and NoCs. For buses, the source and destination are directly linked, and, destination can therefore signal directly to a source that it cannot accept data. This information can even be available to the arbiter, such that the bus is not granted to a transaction trying to write to a full buffer.

In a NoC, however, the destination of a transaction cannot signal directly to a source that its input buffer is full. Consequently, transactions to a destination can be started, possibly from multiple sources, after the destination's input buffer has filled up. If an input buffer is full, additional incoming transitions are not accepted, and stored in the network. However, this approach can easily leat to network congestion, as the data could be eventually stored all the way to the sources, blocking the links in between.

To avoid input buffer overflow connections can be used, together with end-to-end flow control. At connection set up between a master and one or more slaves, buffer space is allocated at the network interfaces of the slaves, and the network interface of the master is assigned credits reflecting the amount of buffer space at the slaves. The master can only send data when it has enough credits for the destination slave(s). The slaves grant credits to the master when they consume data.

SUMMARY OF THE INVENTION

It is an object of the invention to provide an integrated circuit and a method for exchanging messages in an integrated circuit with a more effective usage of the properties of the network.

This object is achieved by an integrated circuit according to claim 1 and a method for exchanging messages according to claim 7.

Therefore, and integrated circuit comprising a plurality of processing modules M; I; S; T and a network N; RN arranged for providing at least one connection between a first and at least one second module is provided. Said connections comprises a set of communication channels each having a set of connection properties. Said connection supports transactions comprising outgoing messages from the first module to the second module and return messages from the second module to the first module. The connection properties of the different communication channels of said connection can be adjusted indepently.

Therefore, the utilization of the resources of a network on chip is more efficient, since the connection between modules can be efficiently adapted to their actual requirement such that the connection is not over dimensioned and unused network resources can be assigned to other connections.

The invention is based on the idea to allow connection channels of a connection with different connection properties.

Acccording to an aspect of the invention, said integrated circuit comprises at least one communication managing means CM for managing the communication between different modules; and at least one resource managing means RM for managing the resources of the network N.

According to a further aspect of the invention, said first module M; I issues a request for a connection to at least one of said second modules to said communication managing means CM. Said communication managing means CM forwards the request for a connection with communication channels each having a specific set of connection properties to said resource managing means (RM). Said resource managing means RM determines whether the requested connection based on said communication channels with said specific connection properties is available, and responds the availability of the requested connection to said communication managing means CM. A connection between the first and second module is established based on the available properties or available network resources required to implement the properties of said communication channels of said connection.

According to a still further aspect of the invention, said communication managing means CM rejects establishing a connection based on the available connection properties when the available connection properties are not sufficient to perform the requested connection between said first and second module. The connection properties require that some network resources are implemented, e.g. a throughput requires slot reservation and flow control requires buffering. Therefore, a connection requiring some properties is opened or not depending on the availability of these resources. Accordingly, the communication manager CM has some control over the minimum requirements for a connection.

According to a further aspect of the invention, said communication managing means CM issues a request to reset the connection between said first and second module, when said modules have successfully performed their transactions, so that the network resources can be used again for other connections.

According to still a further aspect of the invention, said integrated circuit comprises at least one network interface means N1, associated to each of said modules, for managing the communication between said modules and said network N. Hence the modules can be designed independent from the network and can therefore be re-used.

The invention also relates to a method for exchanging messages in an integrated circuit comprising a plurality of modules as described above. The messages between the modules are exchanged over connections via a network. Said connections comprises a set of communication channels each having a set of connection properties. Said connection through the network supports transactions comprising outgoing messages from the first module to the second module and return messages from the second module to the first module. The network manages the outgoing messages in a way different from the return messages, i.e. the connection channels can be configured independently.

Further aspects of the invention are described in the dependent claims.

These and other aspects of the invention are apparent from and will be elucidated with reference to the embodiment(s) described hereinafter.

DESCRIPTION OF THE PREFERRED EMBODIMENTS

The following embodiments relate to systems on chip, i.e. a plurality of modules on the same chip communicate with each other via some kind of interconnect. The interconnect is embodied as a network on chip NOC. The network on chip may include wires, bus time-division multiplexing, switch, and/or routers within a network. At the transport layer of said network, the communication between the modules are performed over connections. A connection is considered as a set of channels, each having a set of connection properties, between a first module and at least one second module. For a connection between a first module and a single second module, the connection comprises two channel, namely one from the first module to the second channel, i.e. the request channel, and a second form the second to the first module, i.e. the response channel. The request channel is reserved for data and messages from the first to the second, while the response channel is reserved for data and messages from the second to the first module. However, if the connection involves one first and N second modules, 2*N channels are provided. The connection properties may include ordering (data transport in order), flow control (a remote buffer is reserved for a connection, and a data producer will be allowed to send data only when it is guaranteed that space is available for the produced data), throughput (a lower bound on throughput is guaranteed), latency (upper bound for latency is guaranteed), the lossiness (dropping of data), transmission termination, transaction completion, data correctness, priority, or data delivery.

Figure 1:
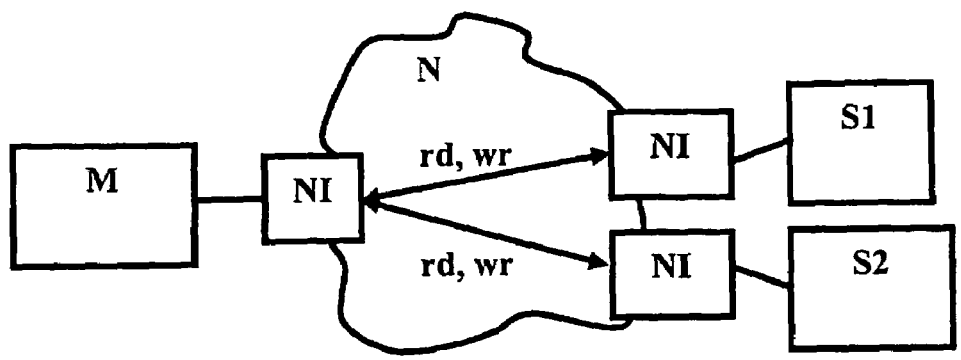
FIG. 1 shows a System on chip according to a first embodiment.

FIG. 1 shows a System on chip according to a first embodiment. The system comprises a master module M, two slave modules S1, S2. Each module is connected to a network N via a network interface NI, respectively. The network interfaces NI are used as interfaces between the master and slave modules M, S1, S2 and network N. The network interfaces NI are provided to manage the communication of the respective modules and the network N, so that the modules can perform their dedicated operation without having to deal with communication with the network or other modules. The network interfaces NI can send requests such as read and write between each other over the network.

Figure 2:
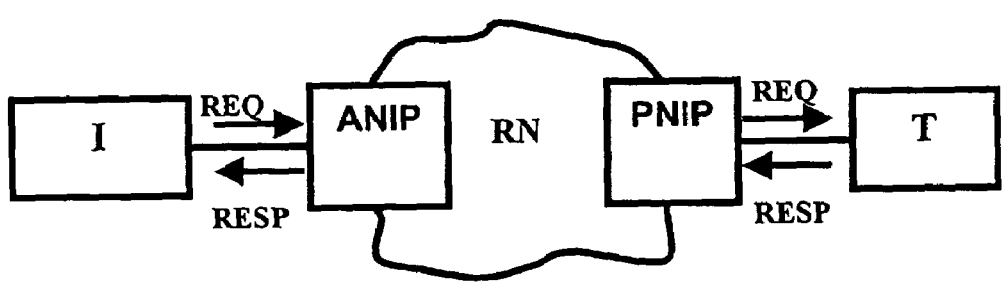
FIG. 2 shows a System on chip according to a second embodiment.

FIG. 2 shows a system on chip according to a second embodiment. The system comprises two modules, namely an initiator I and a target T, a router network RN, and two network interfaces ANIP, PNIP between the modules and the router network RN. The network interfaces provide two network interfaces ports NIP (one request and one response port) through which the modules communicate with the router network RN or other modules via the router network RN. The network interface has one or more ports where modules can be connected. Two different type of ports are available, namely the active network interface port ANIP, which is connected to masters and the passive network interface port PNIP, which is connected to slave. The communication between the initiator module I and the target module T is based on request-response transactions, where the master, i.e. the initiator module L initiates a transaction by placing a request, possibly with some data or required connection properties. The request REQ is delivered to the slave, i.e. the target module T, via the active network interface port ANIP, the network RN and the passive network interface port PNIP. The request is executed by the target module T and data is returned as a response RESP if necessary or required. This response RESP may include data and/or acknowledgement for the master or initiator module I.

The modules as described in FIGS. 1 and 2 can be so-called intellectual property blocks IPs (computation elements, memories or a subsystem which may internally contain interconnect modules) that interact with network at said network interfaces NI. NIs provide NI ports NIP through which the communication services are accessed. A NI can have several NIPs to which one or more IPs can be connected. Similarly, an IP can be connected to more than one NI and NIP.

The communication over the network is performed by the network interfaces on connections. Connections are introduced to describe and identify communication with different properties, such as guaranteed throughput, bounded latency and jitter, ordered delivery, or flow control. For example, to distinguish and independently guarantee communication of 1 Mbs and 25 Mbs, two connections can be used. Two NIPs can be connected by multiple connections, possibly with different properties. Connections as defined here are similar to the concept of threads and connections from OCP and VCI. Where in OCP and VCI connections are used only to relax transaction ordering, we generalize from only the ordering property to include among others configuration of buffering and flow control, guaranteed throughput, and bounded latency per connection.

Figure 3:
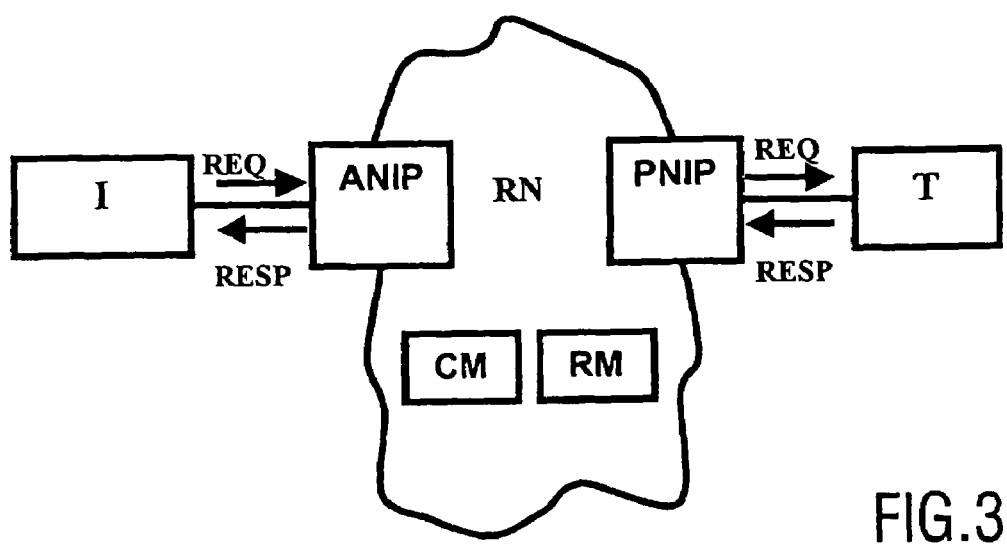
FIG. 3 shows a System on chip according to a third embodiment.

FIG. 3 shows a system on chip according to a third embodiment. The system of the third embodiment is based on the system according to the second embodiment and additionally comprises a communication manager CM and a resource manager RM. Here, the communication manager CM and the resource manager RM are arranged in the router network RN, but they can also be arranged in one or some of the network interfaces NI.

If the initiator module I needs to read or to write data from/to the target module T, a request REQ for a connection with the target module T is issued. This request REQ is send to a request port of the active network interface ports ANIP of the network interface associated to said initiator I. This request can contain information regarding an identification of at least one target module, i.e. a target ID, as well regarding the properties of the connection between the initiator module I and the target module T. The properties of the connection between the two modules may depend on the direction, i.e. the properties of the request channel can be different of the properties of the response channel.

The communication manager CM request a connection with a set of properties between two modules from the resource manager RM, after receiving the request REQ from the active network interface ports ANIP, i.e. the properties of a connection, e.g. throughput, flow control, are to be requested when asking for a connection setup. The resource manager RM allocates the necessary resources and enquires if such a connection based on these resources is possible. The properties require resources to be implemented (e.g., throughput requires slot reservations, flow control requires buffering). Therefore, a connection requiring some properties is opened or not depending on the availability of these resources. The availability of the connection properties correspond to the ability of the network to fulfill or provide the resources for the connection properties identified in the connection setup request. The allocation of the resources can be preformed in two ways. First, the resource manager RM may contain a property table with entries for all the different properties of the channels and connections. Alternatively, one central property table can be provided containing all different properties of the network, i.e. the table can either be central or distributed.

After enquiring of the available connection properties, the resource manager RM reserves the available connection i.e. the required resources, and responds to the communication manager CM which connection is available, i.e. which connection properties or the required resources thereof are available for the desired channels. Optionally, the communication manager CM can accept the connection with the available properties, but on the other hand the communication manager CM may also refuse the offered connection if the available properties or the resources thereof are not acceptable. If the communication manager CM refuses the offered connection, it sends an error message to the initiator module I (i.e. via the ANIP) and requests the resource module RM to release the reservation of said connections. Otherwise, the resource manager RM sets the connection properties, and establishes a connection with accepted properties between said initiator and target modules. After said two modules I, T have performed the transactions as requested by the initiator module, the communication manager CM issues a request to said resource manager RM to reset the connection or the connection properties.

The connections according to the embodiments of the invention must be first created or established with the desired properties before being used. This may result in resource reservations inside the network (e.g., buffer space, or percentage of the link usage per time unit). If the requested resources are not available, the network RN will refuse the request. After usage, connections are closed, which leads to freeing the resources occupied by that connection.

To allow more flexibility in configuring connections, and, hence, better resource allocation per connection, the outgoing and return parts of connections can be configured independently. For example, a different amount of buffer space can be allocated in the NIPs at the master and slaves, or different bandwidths can be reserved for requests and responses.

An example for the use of differential properties for the outgoing and return parts is described as follows. Guaranteed-throughput connections can overbook resources in some cases. For example, when an ANIP opens a guaranteed-throughput read connection, it must reserve slots for the read command messages, and for the read data messages. The ratio between the two can be very large (e.g., 1:100), which leads either to a large number of slots, or bandwidth being wasted for the read command messages.

To solve this problem, the connection properties of the request and response parts of a connection can be configured independently for all of throughput, latency and jitter. Consequently, the connection properties of request part of a connection can be best effort, while the connection properties of response can have guaranteed throughput (or vice versa). For the example mentioned above, we can use best effort read messages, and guaranteed-throughput read-data messages. No global connection guarantees can be offered in this case, but the overall throughput can be higher and more stable than in the case of using only best-effort traffic.

A connection on which only read commands are executed for large blocks of data can be considered as further example. In such a case, if flow control is implemented, a network interface PNIP associated to a slave S, T would require a small buffer, while the network interface ANIP associated to a master M, I would require a large buffer. In an alternative example a guaranteed throughput is required. Typically, a guaranteed throughput are provided by reserving fixed-sized slots from a slot table, where a bandwidth value is associated to each slot, so that the bandwidth values are summed if more slots are allocated. In such a scheme there will be a minimum bandwidth that can be allocated. Therefore, allocating bandwidth only for read commands would be an inefficient use of the bandwidth as read commands would only use a small fraction. The return data responses would probably use enough bandwidth to justify the slow reservation. To prevent such an inefficient bandwidth utilization, the request part of the connection can be set up as best effort (i.e. no throughput guarantees) and guaranteed throughput only for the response part. Accordingly, no overall guarantees will be offered but for a reasonable loaded network, such a connection will still perform well. For a network with a low load this solution may be even faster as best-effort data can be transferred faster (e.g. there is no need to wait for the assigned bandwidth slot).

Depending on the requested services, the time to handle a connection (i.e., creating, closing, modifying services) can be short (e.g., creating/closing an unordered, lossy, best-effort connection) or significant (e.g., creating/closing a multicast guaranteed-throughput connection). Consequently, connections are assumed to be created, closed, or modified infrequently, coinciding e.g. with reconfiguration points, when the application requirements change.

Communication takes place on connections using transaction, consisting of a request and possibly a response. The request encodes an operation (e.g., read, write, flush, test and set, nop) and possibly carries outgoing data (e.g., for write commands). The response returns data as a result of a command (e.g., read) and/or an acknowledgment. Connections involve at least two NIPs. Transactions on a connection are always started at one and only one of the NIPs, called the connection's active NIP (ANIP). All the other NIPs of the connection are called passive NIPs (PNIP).

There can be multiple transactions active on a connection at a time, but more generally than for split buses. That is, transactions can be started at the ANIP of a connection while responses for earlier transactions are pending. If a connection has multiple slaves, multiple transactions can be initiated towards different slaves. Transactions are also pipelined between a single master-slave pair for both requests and responses. In principle, transactions can also be pipelined within a slave, if the slave allows this.

A transaction can be composed from the following messages:

A command message (CMD) is sent by the ANIP, and describes the action to be executed at the slave connected to the PNIP. Examples of commands are read, write, test and set, and flush. Commands are the only messages that are compulsory in a transaction. For NIPs that allow only a single command with no parameters (e.g., fixed-size address-less write), we assume the command message still exists, even if it is implicit (i.e., not explicitly sent by the IP).

An out data message (OUTDATA) is sent by the ANIP following a command that requires data to be executed (e.g., write, multicast, and test-and-set).

A return data message (RETDATA) is sent by a PNIP as a consequence of a transaction execution that produces data (e.g., read, and test-and-set).

A completion acknowledgment message (RETSTAT) is an optional message which is returned by PNIP when a command has been completed. It may signal either a successful completion or an error. For transactions including both RETDATA and RETSTAT the two messages can be combined in a single message for efficiency. However, conceptually, they exist both: RETSTAT to signal the presence of data or an error, and RETDATA to carry the data. In bus-based interfaces RETDATA and RETSTAT typically exist as two separate signals.

Messages composing a transaction are divided in outgoing messages, namely CMD and OUTDATA, and response messages, namely RETDATA, RETSTAT. Within a transaction, CMD precedes all other messages, and RETDATA precedes RETSTAT if present. These rules apply both between master and ANIP, and PNIP and slave.

Connections can be classified as follows:

A simple connection is a connection between one ANIP and one PNIP.

A narrowcast connection is a connection between one ANIP and one or more PNIPs, in which each transaction that the ANIP initiates is executed by exactly one PNIP. An example of the narrowcast connection, where the ANIP performs transactions on an address space which is mapped on two memory modules. Depending on the transaction address, a transaction is executed on only one of these two memories.

A multicast connection is a connection between one ANIP and one or more PNIPs, in which the sent messages are duplicated and each PNIP receives a copy of those messages. In a multicast connection no return messages are currently allowed, because of the large traffic they generate (i.e., one response per destination). It could also increase the complexity in the ANIP because individual responses from PNIPs must be merged into a single response for the ANIP. This requires buffer space and/or additional computation for the merging itself.

Connecting properties that can be configured for a connection are as follows: guaranteed message integrity, guaranteed transaction completion, various transaction orderings, guaranteed throughput, bounded latency and jitter, and connection flow control.

Data integrity means that the content of messages is not changed (accidentally or not) during transport. We assume that data integrity is already solved at a lower layer in our network, namely at the link layer, because in current on-chip technologies data can be transported uncorrupted over links. Consequently, our network interface always guarantees that messages are delivered uncorrupted at the destination.

A transaction without a response (e.g. a posted write) is said to be complete when it has been executed by the slave. As there is no response message to the master, no guarantee regarding transaction completion can be given.

A transaction with a response (e.g. an acknowledged write) is said to be complete when a RETSTAT message is received from the ANIP. Recall that when data is received as a response (RETDATA), a RETSTAT (possibly implicit) is also received to validate the data. The transaction may either be executed successfully, in which case a success RETSTAT is returned, fail in its execution at the slave, and then an execution error RETSTAT is returned, or fail because of buffer overflow in a connection with no flow control, and then it reports an overflow error. We assume that when a slave accepts a CMD requesting a response, the slave always generates the response.

In the network, routers do not drop data, therefore, messages are always guaranteed to be delivered at the NI. For connections with flow control, also NIs do not drop data. Thus, message delivery and, thus, transaction completion to the IPs is guaranteed automatically in this case.

However, if there is no flow control, messages may be dropped at the network interface in case of buffer overflow. All of CMD, OUTDATA, and RETDATA may be dropped at the NI. To guarantee transaction completion, RETSTAT is not allowed to be dropped. Consequently, in the ANIPs enough buffer space must be provided to accommodate RETSTAT messages for all outstanding transactions. This is enforced by bounding the number of outstanding transactions.

Now the ordering requirements between different transactions within a single connection are described. Over different connections no ordering of transactions is defined at the transport layer.

There are several points in a connection where the order of transactions can be observed:(a) the order in which the master module M, I presents CMD messages to the ANIP, (b) the order in which the CMDs are delivered to the slave module T, S by the PNIP, (c) the order in which the slave module T, S presents the responses to the PNIP, and (d) the order the responses are delivered to the master by the ANIP. Note that not all of (b), (c), and (d) are always present. Moreover, there are no assumptions about the order in which the slaves execute transactions; only the order of the responses can be observed. The order of the transaction execution by the slaves is considered to be a system decision, and not a part of the interconnect protocol.

At both ANIP and PNIPs, outgoing messages belonging to different transactions on the same connection are allowed to be interleaved. For example, two write commands can be issued, and only afterwards their data If the order of OUT-DATA messages differs from the order of CMD messages, transaction identifiers must be introduced to associate OUTDATAs with their corresponding CMD.

Outgoing messages can be delivered by the PNEPs to the slaves (see b) as follows:

Unordered, which imposes no order on the delivery of the outgoing messages of different transactions at the PNIPs.

Ordered locally, where transactions must be delivered to each PNIP in the order they were sent (a), but no order is imposed across PNIPs. Locally-ordered delivery of the outgoing messages can be provided either by an ordered data transportation, or by reordering outgoing messages at the PNIP.

Ordered globally, where transactions must be delivered in the order they were sent, across all PNIPs of the connection. Globally-ordered delivery of the outgoing part of transactions require a costly synchronization mechanism.

Transaction response messages can be delivered by the slaves to the PNIPs (c) as Ordered, when RETDATA and RETSTAT messages are returned in the same order as the CMDs were delivered to the slave (b), or as Unordered, otherwise. When responses are unordered, there has to be a mechanism to identify the transaction to which a response belongs. This is usually done using tags attached to messages for transaction identifications (similar to tags in VCI).

Response messages can be delivered by the ANIP to the master (see d) as follows:

Unordered, which imposes no order on the delivery of responses. Here, also, tags must be used to associate responses with their corresponding CMDs.

Ordered locally, where RETDATA and RETSTAT messages of transactions for a single slave are delivered in the order the original CMDs were presented by the master to the ANIP. Note that there is no ordering imposed for transactions to different slaves within the same connection.

Globally ordered, where all responses in a connection are delivered to the master in the same order as the original CMDs. When transactions are pipelined on a connection, then globally-ordered delivery of responses requires reordering at the ANIP.

All $3 \times 2 \times 3 = 18$ combinations between the above orderings are possible. Out of these, we define and offer the following two. An unordered connection is a connection in which no ordering is assumed in any part of the transactions. As a result, the responses must be tagged to be able identify to which transaction they belong. Implementing unordered connections has low cost, however, they may be harder to use, and introduce the overhead of tagging.

An ordered connection is defined as a connection with local ordering for the outgoing messages from PNIPs to slaves, ordered responses at the PNIPs, and global ordering for responses at the ANIP. We choose local ordering for the outgoing part because the global ordering has a too high cost, and has few uses. The ordering of responses is selected to allow a simple programming model with no tagging. Global ordering at the ANIP is possible at a moderate cost, because all the reordering is done locally in the ANIP. A user can emulate connections with global ordering of outgoing and return messages at the PNIPs using non-pipelined acknowledged transactions, at the cost of high latency.

In the network, throughput can be reserved for connections in a time-division multiple access (TDMA) fashion, where bandwidth is split in fixed-size slots on a fixed time frame. Bandwidth, as well as bounds on latency and jitter can be guaranteed when slots are reserved. They are all defined in multiples of the slots.

As mentioned earlier, the network guarantees that messages are delivered to the NI. Messages sent from one of the NIPs are not immediately visible at the other NIP, because of the multi-hop nature of networks. Consequently, handshakes over a network would allow only a single message be transmitted at a time. This limits the throughput on a connection and adds latency to transactions. To solve this problem, and achieve a better network utilization, the messages must be pipelined. In this case, if the data is not consumed at the PNIP at the same rate it arrives, either flow control must be introduced to slow down the producer, or data may be lost because of limited buffer space at the consumer NI.

End-to-end flow control may be introduced at the level of connections, which requires buffer space to be associated with connections. End-to-end flow control ensures that messages are sent over the network only when there is enough space in the NIP's destination buffer to accommodate them.

End-to-end flow is optional (i.e., to be requested when connections are opened) and can be configured independently for the outgoing and return paths. When no flow control is provided, messages are dropped when buffers overflow. Multiple policies of dropping messages are possible, as in off-chip networks. Possible scenarios include: (a) the oldest message is dropped (milk policy), or (b) the newest message is dropped (wine policy).

One example for flow control is a credit-based flow control. Credits are associated with the empty buffer space at the receiver NI. The sender's credit is lowered as data is sent. When the PNIP delivers data to the slave, credits are granted to the sender. If the sender's credit is not sufficient to send some data, the NI at the sender stalls the sending.

To illustrate the need for differentiated services on connections, some examples of traffic are described below. Video processing streams typically require a loss less, in-order video stream with guaranteed throughput, but possibly allow corrupted samples. An connection for such a stream would require the necessary throughput, ordered transactions, and flow control. If the video stream is produced by the master, only write transactions are necessary. In such a case, with a flow-controlled connection there is no need to also require transaction completion, because messages are never dropped, and the write command and its data are always delivered at the destination. Data integrity is always provided by our network, even though it may be not necessary in this case.

Another example is that of cache updates which require uncorrupted, loss less, low-latency data transfer, but ordering and guaranteed throughput are less important. In such a case, a connection would not require any time related guarantees, because a low latency, even if preferable, is not critical. Low latency can be obtained even with a best-effort connection. The connection would also require flow control and guaranteed transaction completion to ensure loss less transactions. However, no ordering is necessary, because this is not important for cache updates, and allowing out of order transaction can reduce the response time.

A set of NoC services is defined that abstract from the network details. Using these services in IP design decouples computation and communication. A request-response transaction model is used to be close to existing on-chip interconnect protocols. This eases the migration of current IPs to NoCs. To fully utilize the NoC capabilities, such as high bandwidth and transaction concurrency, connection-oriented communication are provided. Connections can be configured independently with different properties. These properties include transaction completion, various transaction orderings, bandwidth lower bounds, latency and jitter upper bounds, and flow control.

The provision of such network on chip NoC services is a prerequisite for service-based system design which makes applications independent of NoC implementations, makes designs more robust, and enables architecture-independent quality-of-service strategies.

In other situations there may be different types of flow control (e.g. you never want to lose write commands, but don't mind losing read data). If a module can do both read and write commands, it may be important that write transactions always succeed (e.g. when writing to an interrupt controller), but that read transactions are not critical because they can be retried (so the CMD of the read transaction is dropped and the read never executed, or the RETDATA is dropped after the read has been executed. Another example is that if you know that writes always succeed if they are delivered, a flow-controlled connection is requested. Acknowledgements are not necessary in that case. Without flow control acknowledgements are compulsory, complicating the master and causing additional traffic.

In the integrated circuit according to the invention the decision to drop messages or not is not decided per transaction but for the outgoing and return parts of connection as a whole. For example all outgoing messages having the format reads+address or writes+address+data) may be guaranteed lossless, while for all return messages (whether read data, write acknowledgements) packets may be dropped.

A connection could be opened as follows:

```
connid = open (
    nofc/fc,
    outgoing unordered/local/global,
    outgoing buffer size,
    return unordered/local/global,
    return buffer size);
``` i.e. all outgoing messages have certain properties, and all return messages have certain properties. Where fc represents flow control and nofc represents no flow control.

An alternative solution for deadlock in NoCs, which takes into consideration that modules connecting to the network are either masters (initiating requests and receiving responses), or slaves (receiving requests and sending back responses), is to maintain separate virtual networks (with separate buffers) for requests and responses.

According to an embodiment of the invention, a method for exchanging messages in an integrated circuit comprising a plurality of modules requests for a connection with specific properties between two modules, decides if said requested connection with said properties between said two modules is possible, responds the connection with available properties, establishes a connection with said properties between said two modules, and performs transactions between said two modules. Additionally, the available connection may be accepted and the properties of said connection may be reset.

According to a further embodiment of the invention, the network has a first mode wherein a message is transferred within a guaranteed time interval, and a second mode wherein a message is transferred as fast as possible with the available resources, wherein the outgoing transaction is a read message, requesting the second module to send data to the first module, wherein the return transaction is the data generated by the second module upon this request, and wherein the outgoing transaction is transferred according to the second mode, and the return transaction is transferred according to the first mode. For acknowledged write transaction the write command and the outgoing data for the master use guaranteed throughput, and acknowledgment from the slaves uses best effort. Except for time-related guarantees, there is also a distinction on the buffering in the above examples. For data messages there is potentially more buffering allocated than for commands and acknowledgments. Consequently, for a read transaction buffers for the return part would be larger than those for the outgoing part. For the acknowledged write buffers the outgoing part are larger, and those for acknowledgments are smaller.

According to a further embodiment, it is possible to allocate different bandwidths for different channels. However, there are also limitations. A slot table is used, which contains a number of slots in a time window. Bandwidth is reserved allocating these slots to connections. For example, if a table with 100 slots for a time frame of 1 μs is used, each slot will be allocated for 1/100 from 1 μs=10 ns. If the network provides 1 Gb/s per link, the bandwidth per slot will be 1/100 from 1 Gbs=10 Mb/s. Therefore, only multiple of 10 Mb/s for guaranteed throughput traffic can be allocated. For a read command generating long bursts, allocating the minimum bandwidth of 10 Mb/s would be probably to much, as it will use only a small fraction of it. The bandwidth can indeed be used by best-effort traffic, however, not by other guaranteed throughput traffic. As a result, not all the traffic for which guarantees are needed may fit in the slot table. An alternative is to use more slots, but this increases the cost of the router. Accordingly, a best effort command may be a better solution.

According to still a further embodiment of the invention, a connection between a master and two slave is provided, wherein different properties are assigned to the different channels from the master to the slaves. One of these slaves is a fast memory and the other one is a slow memory. A higher throughput is assigned to the channel connecting the master and the fast memory.

As described above, NoCs have different properties from both existing off-chip networks and existing on-chip interconnects. As a result, existing protocols and service interfaces cannot be adopted directly to NoCs, but must take the characteristics of NoCs into account. For example, a protocol such as TCP/IP assumes the network is lossy, and includes significant complexity to provide reliable communication. Therefore, it is not suitable in a NoC where we assume data transfer reliability is already solved at a lower level. On the other hand, existing on-chip protocols such as VCI, OCP, AMBA, or CoreConnect are also not directly applicable. For example, they assume ordered transport of data: if two requests are initiated from the same master, they will arrive in the same order at the destination. This does not hold automatically for NoCs. Atomic chains of transactions and end-to-end flow control also need special attention in a NoC interface.

The objectives when defining network services are the following. First, the services should abstract from the network internals as much as possible. This is a key ingredient in tackling the challenge of decoupling the computation from communication, which allows IPs (the computation part), and the interconnect (the communication part) to be designed independently from each other. As a consequence, the services are positioned at the transport layer in the OSI reference model, which is the first layer to be independent of the implementation of the network. Second, a NoC interface should be as close as possible to a bus interface. NoCs can then be introduced non-disruptively: with minor changes, existing IPs, methodologies and tools can continue to be used. As a consequence, a request-response interface is used, similar to interfaces for split buses. Third, the interface extends traditional bus interfaces to fully exploit the power of NoCs. For example, connection-based communication which does not only relax ordering constraints (as for buses), but also enables new communication properties, such as end-to-end flow control based on credits, or guaranteed throughput. All these properties can be set for each connection individually.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. Integrated circuit comprising a plurality of processing modules (M; I; S; T), network (N; RN), and at least one resource manager (RM) for managing resources of the network (N), wherein the modules, network and resource manager are disposed on a chip and arranged for providing at least one connection between a first and at least one second module, wherein the at least one connection comprises a set of communication channels each having a set of connection properties, the connection properties of the different communication channels of said connection being adjustable independently, wherein said connection supports transactions comprising at least one of outgoing messages from the first module to the second module and return messages from the second module to the first module, wherein the resource manager determines whether the at least one connection with said communication channels is available based on the connection properties being available.

2. Integrated circuit according to claim 1, further comprising: at least one communication manager (CM) for managing the communication between different modules.

3. The Integrated circuit of claim 1, further comprising at least one of a switch and a router.

4. The Integrated circuit of claim 1, further comprising a chip, wherein the processing modules and the network are disposed on said chip.

5. The Integrated circuit of claim 1, wherein the connection properties comprise at least one of data transport ordering, flow control, throughput, latency, and lossiness.

6. Integrated circuit according to claim 2, wherein said first module (M; I) is adapted to issue a request (REQ) for a connection with at least one of said second modules to said communication manager (CM), said communication manager (CM) is adapted to forward said request (REQ) for a connection with communication channels each having a specific set of connection properties to said resource manager (RM), said resource manager (RM) responding with the availability of the requested connection to said communication manager (CM), wherein a connection between the first and second module is established based on the available properties of said communication channels of said connection.

7. Integrated circuit according to claim 2, wherein said communication manager (CM) is adapted to reject establishing a connection based on the available connection properties when the available connection properties are not sufficient to perform the requested connection between said first and second module (M, I, S, T).

8. Integrated circuit according to claim 2, wherein said communication manager (CM) is adapted to request a reset of the connection between said first and second module (M, I, S, T), when said modules have successfully performed their transactions.

9. Integrated circuit according to claim 2, further comprising: at least one network interface means (NI), associated to each of said modules, for managing the communication between said modules and said network (N).

10. Method for exchanging messages in an integrated circuit comprising a plurality of modules, the messages between the modules being exchanged over connections via a network, wherein said connections comprises a set of communication channels each having a set of connection properties, any communication channel being independently configurable, wherein said connection through the network supports transactions comprising at least one of outgoing messages from the first module to the second module and return messages from the second module to the first module and further comprising the steps of:

the first module issuing a request for a connection with the second module to a communication manager, wherein the request comprises desired connection properties associated with the sets of communication channels;

the communication manager forwarding the request to a resource manager;

the resource manager determining whether a target connection with the desired connection properties is available;

the resource manager responding with the availability of the target connection to the communication manager; and the target connection between the first and second module being established based on the available properties of said communication channels of said connection.

11. The method of claim 10, wherein the network manages traffic utilizing at least one of a switch and a router.

12. The method of claim 10, wherein the processing modules and the network are disposed on a chip.

13. The method of claim 10, wherein the connection properties comprise at least one of data transport ordering, flow control, throughput, latency, and lossiness.

14. The method of claim 10, further comprising the resource manager determining whether the target connection with the desired connection properties is available based on reading of a centralized or distributed property table comprising properties associated with the network.

15. The method of claim 10, further comprising the resource manager reserving the target connection after determining whether the target connection with the desired connection properties is available.

16. The method of claim 10, wherein the connection properties comprise at least one of throughput, latency and jitter.

17. The method of claim 15, further comprising the communication manager rejecting establishing a connection based on the available connection properties when the available connection properties are not sufficient to perform the requested connection between said first and second modules.

18. The method of claim 17, further comprising the communication manager sending a release request to the resource manager to release the reservation of the communication channels associated with the target connection when the target connection is refused.

* * * * *